(12) United States Patent
Hwang et al.

(10) Patent No.: US 6,761,863 B2
(45) Date of Patent: Jul. 13, 2004

(54) PROCESS FOR THE REMOVAL OF IMPURITIES FROM GAS STREAMS

(75) Inventors: Shuen-Cheng Hwang, Chester, NJ (US); Neeraj Saxena, Murray Hill, NJ (US); Robert J. Ferrell, Rutherford, NJ (US); Naresh Suchak, North Plainfield, NJ (US); Lev Davydov, North Plainfield, NJ (US); James K. Tseng, Berkeley Heights, NJ (US); Chester Gorski, Kendall Park, NJ (US)

(73) Assignee: The BOC Group, Inc., New Providence, NJ (US)

( * ) Notice: Subject to any disclaimer, the term of this patent is extended or adjusted under 35 U.S.C. 154(b) by 206 days.

(21) Appl. No.: 10/059,459

(22) Filed: Jan. 29, 2002

(65) Prior Publication Data

US 2003/0143140 A1 Jul. 31, 2003

(51) Int. Cl.[7] .............................................. B01D 53/56
(52) U.S. Cl. .................... 423/235; 423/210; 423/215.5; 423/239.1; 423/243.01
(58) Field of Search .............................. 423/210, 215.5, 423/235, 239.1, 243.01; 95/223, 232, 234, 235

(56) References Cited

U.S. PATENT DOCUMENTS

| | | | |
|---|---|---|---|
| 5,206,002 A | 4/1993 | Skelley et al. ............... 423/235 |
| 5,233,934 A | 8/1993 | Krigmont et al. ............ 110/345 |
| 5,316,737 A | 5/1994 | Skelley et al. ............... 422/170 |
| 5,743,929 A | 4/1998 | Kapoor et al. .............. 65/134.6 |
| 5,985,223 A | 11/1999 | Saxena et al. ............... 423/235 |
| 6,132,692 A | 10/2000 | Alix et al. | |
| 6,136,284 A | 10/2000 | Hwang et al. ............... 423/235 |
| 6,197,268 B1 | 3/2001 | Hwang et al. ............... 423/235 |
| 6,294,139 B1 | 9/2001 | Vicard et al. | |

FOREIGN PATENT DOCUMENTS

| | | |
|---|---|---|
| EP | 0 323 206 A1 | 7/1989 |
| WO | WO 96/09108 A | 3/1996 |

*Primary Examiner*—Steven Bos
*Assistant Examiner*—Maribel Medina
(74) *Attorney, Agent, or Firm*—Philip H. Von Neida

(57) ABSTRACT

The present invention relates to a process for removing nitrogen oxides, sulfur oxides, mercury and mercuric oxide from gas streams such as furnace or utility boiler flue gas streams, particularly those derived from coal-fired utility boilers, or from a gas stream from another pollutant abatement process. Ozone will react with the impurities in the gas stream to form mercuric oxide and higher oxides of nitrogen which can be removed by scrubber means. Additionally, and alternatively, the present invention provides for the use of ozone and ultraviolet radiation to remove nitrogen oxides, sulfur oxides and mercury from gas streams.

24 Claims, 4 Drawing Sheets

PROCESS FOR THE REMOVAL OF IMPURITIES FROM GAS STREAMS

FIELD OF THE INVENTION

The present invention relates to a process for removing impurities from gas streams utilizing ozone, ultraviolet radiation, or a combination of both. More particularly, the present invention provides for means to remove simultaneously multi-pollutants such as nitrogen oxides, sulfur oxides, mercury and mercuric oxide from gas streams containing these impurities.

BACKGROUND OF THE INVENTION

Recent federal and local environmental laws require very significant reduction of discharge of harmful gaseous substances into the atmosphere. Chief among such harmful air pollutants are nitrogen oxides ($NO_x$). In response to strict enforcement efforts of these laws, industrial air polluters have made considerable efforts to reduce the amount of these harmful substances into the air in gaseous effluents from industrial or municipal sources. Successful efforts to reduce the concentration of $NO_x$ in gaseous effluents often involve reacting the $NO_x$ in waste gases with nitrogen-based reducing agents.

Another known method of removing $NO_x$ from gas streams involves contacting the $NO_x$ with ozone, thereby oxidizing them to higher nitrogen oxides, such as $N_2O_5$ and removing the higher oxides from the gas stream by means of aqueous scrubbers.

Specific details of ozone-based $NO_x$ oxidation processes are disclosed in U.S. Pat. Nos. 5,206,002; 5,316,737; 5,985,223; and 6,197,268, the disclosures of which are incorporated herein by reference.

Additionally, the Environmental Protection Agency has presented information showing mercury levels in the environment are at levels that are likely to lead to adverse health effects. Coal-fired utility boilers are one of the largest sources of harmful anthropogenic mercury emissions but also include the $NO_x$ and $SO_x$ emissions sources. The present inventors have discovered a process whereby mercury as well as $NO_x$ and $SO_x$ can be removed from the emission from coal-fired utility boiler flue gas.

SUMMARY OF THE INVENTION

The present invention provides for a process for removing impurities such as nitrogen oxides, sulfur oxides and mercury from a gas stream comprising the steps of passing the gas stream into a reaction zone or duct, reacting the impurities with ozone to form $N_2O_5$ and mercuric oxide and passing the gas stream containing these oxides to an aqueous alkaline scrubber to remove the $N_2O_5$ and mercuric oxide, as well as the sulfur oxides present in the gas stream.

The present invention also provides for a process for removing nitrogen oxides, sulfur oxides and mercury from a gas stream comprising the steps of passing the gas through a wet scrubber, then passing the gas, which is now free of water-soluble acid gases and particulate matter, to a reaction duct where ozone is inputted to oxidize nitrogen oxides and mercury. The gas stream is then passed to a second wet scrubber containing an acidic medium where soluble higher orders of nitrogen oxides and metallic oxides are removed. Lastly, the gas stream is directed to a third wet scrubber system where sulfur oxides are removed, resulting in a cleaner gas stream for emission to the atmosphere.

Alternatively, the present invention provides for a process for removing nitrogen oxides and mercury from a gas stream whereby the gas stream is directed to a reaction duct where ozone is inputted. The resulting gas stream is then passed to a wet acid scrubber where particulate matter, and higher order of nitrogen oxides and mercuric oxide, formed in the reaction duct, are removed from the gas stream. This gas stream is then directed to a chamber whereby the gas stream is irradiated for a sufficient time by ultraviolet radiation which causes the remaining mercury to react with the oxygen. The resulting gas stream is then passed to an aqueous scrubber whereby the mercuric oxide is washed out of the gas stream.

The present invention also provides for a process for removing impurities from a gas stream which may include mercuric oxide as well as nitrogen oxides, sulfur oxides and elemental mercury. The gas stream is directed to an aqueous alkaline scrubber where sulfur oxides, mercuric oxide, when present, acid gases and particulates are removed. This gas stream passes to a reaction zone or duct where the nitrogen oxides and mercury present in the gas stream will react with ozone to form $N_2O_5$ and mercuric oxide. The gas stream containing these impurities is then directed to another aqueous alkaline scrubber where the oxides and mercuric oxide be scrubbed out from the gas stream.

DETAILED DESCRIPTION OF THE INVENTION

Figure 1:
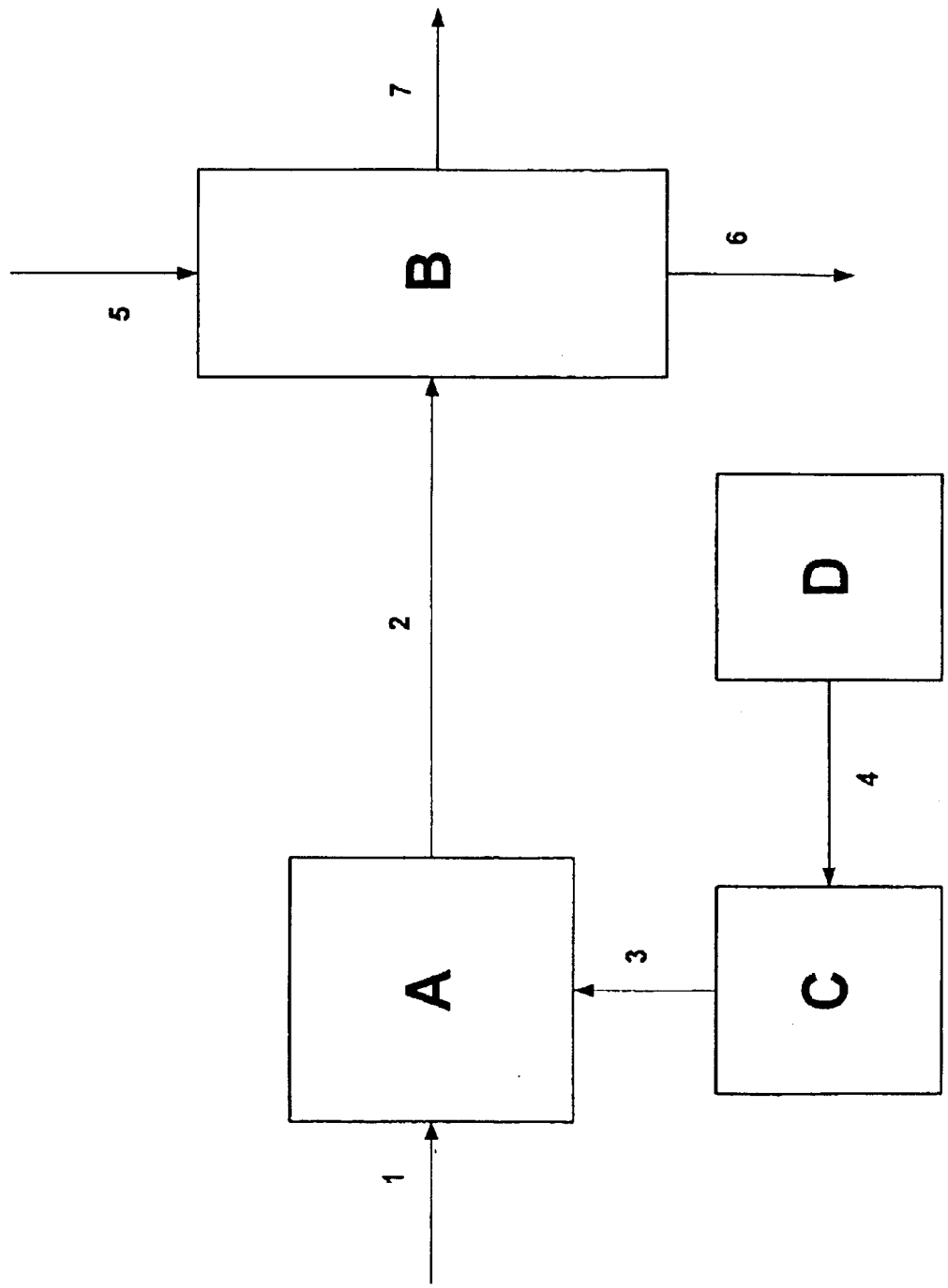
FIG. 1 is a schematic representation of an embodiment of a gas purification system under which the present invention can be practiced.

The present invention relates to a process for removing impurities from a gas stream. The impurities typically are nitrogen oxides, sulfur oxides, mercury and particulate matter. The process comprises the steps of passing the gas stream into a reaction zone where ozone is injected. The ozone will react with the nitrogen oxides and mercury present in the gas stream to form $N_2O_5$ and mercuric oxide. The gas stream which contains these impurities as well as sulfur oxides is directed to an aqueous alkaline scrubber where the oxides will be scrubbed or polished from the gas stream. The resultant gas stream can then be returned to the original industrial process where it derived from or discharged into the atmosphere.

The process of the present invention also comprises the steps of passing the gas stream containing the impurities through a conventional scrubber where contact with the water will remove water-soluble acid gases and particulate pollutants. The gas stream is then directed to a reaction duct where ozone obtained from an ozone generator is fed into the reaction duct. Sufficient reaction time is allowed to oxidize the nitrogen oxides and heavy metals present in the gas stream.

The nitrogen oxides that are problematic in the gas stream are typically NO and $NO_2$, while the sulfur oxides that are problematic are typically $SO_2$ and $SO_3$.

The thus treated gas stream is fed to a second scrubber which contains an acidic medium and water soluble nitrogen oxides and metallic oxides are washed out of the gas stream. Lastly, the emitted gas stream is fed to a third scrubber which contains an alkaline solution, which will assist in removing sulfur oxides from the gas stream and the cleansed gas stream is emitted into the atmosphere or recycled for other uses. The gas stream is typically a flue gas stream which derives from a furnace or utility boiler.

In an alternative embodiment of the present invention, a gas stream containing impurities is irradiated with an ultraviolet source in the range of about 180 to about 270 nanometers, with a wavelength of about 254 nanometers preferred for a time sufficient to convert any mercury in the gas stream to mercuric oxide.

This mechanism by which the present inventors believe this to occur is detailed as such:

$Hg+h\nu \rightarrow Hg^*$ $Hg^*+O_2 \rightarrow Hg+O_2^*$ $O_2^*+O_2 \rightarrow O_3+O^*$ $Hg+O_3 \rightarrow HgO+O_2$ $Hg+O \rightarrow HgO$ In this process, the gas stream, which is typically a flue gas stream from a furnace or utility boiler is directed into a reaction duct where ozone is also injected. Sufficient time is allowed for the reaction to occur between nitrogen oxides and the ozone and the resulting gas stream is directed to an aqueous scrubber where the nitrogen oxide reaction products and particulates are washed out of the gas stream.

The gas stream leaves the scrubber and is directed to a contacting chamber where it is held and irradiated with ultraviolet light at a wavelength of about 180 to about 270 nanometers with a wavelength of about 254 nanometers preferred for a time sufficient to convert elemental mercury into mercuric oxide. The gas stream containing the mercuric oxide is then directed to an aqueous scrubber which contains a dilute acidic solution. The gas stream is scrubbed of the mercuric oxide which exits the scrubber through an effluent port and the gas stream which is now essentially free of mercury can be released to the atmosphere or recycled back for additional uses. Ultraviolet will also react with any excess ozone left.

In an additional alternative embodiment of the present invention, mercuric oxide, HgO, may already be present in the gas stream to be treated for the nitrogen oxides, sulfur oxides and mercury impurities. The gas stream containing these impurities and HgO if it is present is directed first to an aqueous alkaline scrubber. This scrubber will remove the sulfur oxides, particulate materials and HgO present as well as acid gases from the gas stream. This leaves the impurities in the gas stream to be primarily nitrogen oxides and elemental mercury. The gas stream containing these is then directed to a reaction duct where ozone is injected and allowed to react for a sufficient time with the impurities in the gas stream to form $N_2O_5$ and mercuric oxide. To finish the process, this gas stream is directed to another aqueous alkaline scrubber where the $N_2O_5$ and mercuric oxide are scrubbed from the gas stream.

For a more detailed description of the invention, reference is now made to FIG. 1.

Process gas line 1 is fed into a reaction duct A. Reaction duct A receives ozone through line 3 from an ozone generator C which in turn receives oxygen through line 4 from oxygen generator D. The ozone generator D can be any type of ozonizer such as a high voltage corona discharge generator. Typically, the ozone containing gas comprises about 0.5 to about 25% by weight ozone with the balance being oxygen and air components, if air is used to generate ozone.

The ozone should be injected in a molar ratio to nitrogen oxides and mercury such that about 0.5 to about 5 moles of ozone are injected for every mole of nitrogen oxides and mercury. The residence time at which the ozone remains in the reaction duct A should be sufficient to react the nitrogen oxides and mercury present in the gas stream, however, about 0.5 to about 15 seconds is a sufficient reaction time, with a reaction time of about 3 to about 10 seconds preferable and a reaction time of about 4 to about 8 seconds more preferable yet.

The nitrogen oxides and ozone will react in reaction duct A to form nitric acid, nitric acid precursors and mixtures thereof. The heavy metals, notably mercury present in the gas stream will also be oxidized and form mercuric oxide. The gas stream that now contains the oxidized nitrogen oxides reaction products and mercuric oxide is directed along line 2 to an aqueous alkaline scrubber B. Aqueous alkaline solution having a pH above 7 is fed into the scrubber B through line 5. The scrubber may be any suitable vessel and can be equipped with baffling or an inert material to enhance contact between the scrubbing liquid and the gas that is being purified. The aqueous liquid scrubbing step is preferably carried out at a pH greater than 7 and is most preferably carried out at a pH greater that 9. The aqueous liquid may be water in which case a dilute aqueous nitric acid solution from reaction with the nitrogen oxides will be produced.

However, in preferred embodiments, the aqueous liquid is a dilute basic solution. Suitable basic aqueous solutions include alkali metal hydroxides such as sodium hydroxide, potassium hydroxide, etc., and alkaline earth metal hydroxides such as calcium hydroxide, magnesium hydroxide, etc. and ammonium hydroxide. Preferably, the aqueous solution contains a base having good water solubility such as sodium hydroxide, potassium hydroxide, ammonium hydroxide, etc. Most preferably, the caustic solution is aqueous sodium hydroxide which is readily available, relatively inexpensive and produces environmentally acceptable products upon reaction with the gas stream components.

The temperature of the gas stream entering the wet alkaline scrubber will typically be hotter than 100° C. and will be quenched in temperature by contacting the aqueous scrubber.

Line 6 is the discharge line from the alkaline scrubber B where aqueous solutions of the scrubbed components, notably the $N_2O_5$ and mercuric oxide, are removed from the scrubber. The emitted gas which is now free of nitrogen oxides and metallic elements such as mercury is passed through line 7 to be discharged to the atmosphere or for further processing or recycled back to earlier in the process generating the gas stream.

Figure 2:
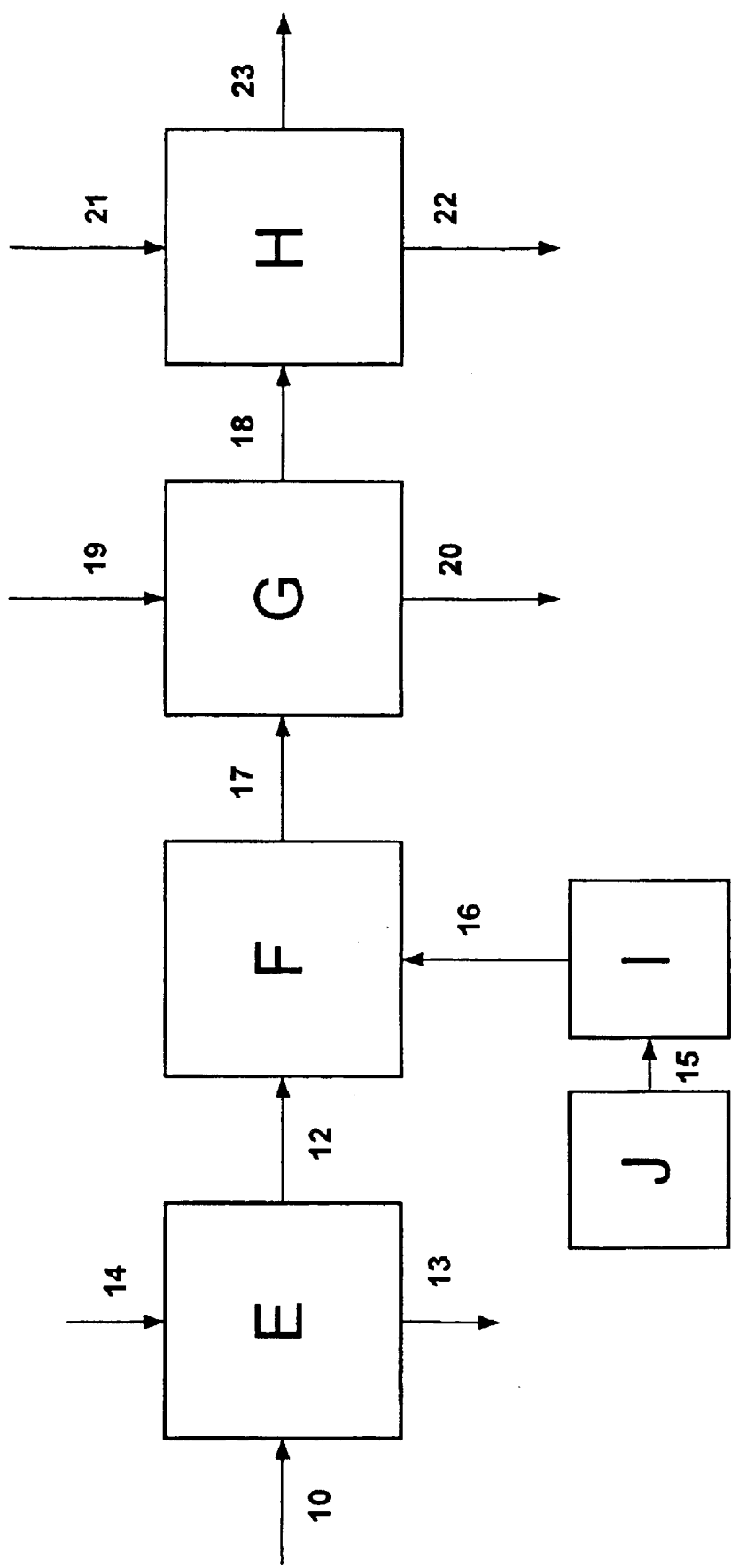
FIG. 2 is another schematic representation of an embodiment of a gas purification system under which the present invention can be practiced.

An alternative embodiment of the present invention is made reference to in FIG. 2.

Process gas line 10 is fed into a wet alkaline scrubber E. Aqueous alkaline solution having a pH above 7 is fed into the scrubber E through line 14. The scrubber may be any suitable vessel and can be equipped with baffling or an inert material to enhance contact between the scrubbing liquid and the gas that is being purified. The aqueous liquid scrubbing step is preferably carried out at a pH greater than 7 and is most preferably carried out at a pH greater that 9. Dilute aqueous nitric acid solution from the reaction with water and the nitrogen oxides will be produced.

However, in preferred embodiments, the aqueous liquid is a dilute basic solution. Suitable basic aqueous solutions include alkali metal hydroxides such as sodium hydroxide, potassium hydroxide, etc., and alkaline earth metal hydroxides such as calcium hydroxide, magnesium hydroxide, etc. and ammonium hydroxide. Preferably, the aqueous solution contains a base having good water solubility such as sodium hydroxide, potassium hydroxide, ammonium hydroxide, etc. Most preferably, the caustic solution is aqueous sodium hydroxide which is readily available, relatively inexpensive and produces environmentally acceptable products upon reaction with the gas stream components.

The temperature of the gas stream entering the wet alkaline scrubber will typically be hotter than 100° C. and will be quenched in temperature by contacting the aqueous scrubber.

Line 13 is the discharge line from the alkaline scrubber E where aqueous solutions of the scrubbed components, notably particulates and water-soluble acid gases, are removed from the scrubber. The now acid gases and particulate-free gas stream is directed along line 12 to reaction duct F. Reaction duct F receives ozone through line 16 from an ozone generator I which in turn receives oxygen through line 15 from oxygen generator J. The ozone generator I can be any type of ozonizer such as a high voltage corona discharge generator. Typically, the ozone containing gas comprises about 0.5 to about 25% by weight ozone with the balance being oxygen and air components, if air is used to generate ozone.

The ozone should be injected in a molar ratio to nitrogen oxides and mercury such that about 0.5 to about 5 moles of ozone are injected for every mole of nitrogen oxides and mercury. The residence time at which the ozone remains in the reaction duct F should be sufficient to react the nitrogen oxides and mercury present in the gas stream, however, about 0.5 to about 15 seconds is a sufficient reaction time.

The nitrogen oxides and ozone will react in reaction duct F to form nitric acid, nitric acid precursors and mixtures thereof. The heavy metals, notably mercury present in the gas stream will also be oxidized and form mercuric oxide. The gas stream that now contains the oxidized nitrogen oxides reaction products and mercuric oxide is directed from reaction duct F through line 17 to a wet acid scrubber G. The wet acid scrubber G contains an aqueous acidic solution with pH maintained below 7 and preferably in the range of 4 to 7. Input line 19 provides fresh aqueous acid solution to the acid scrubber G while discharge line 20 removes the aqueous solution containing the reaction by-products of the acid scrubbing process. The pH is maintained so as to minimize the adsorption of sulfur oxides while maintaining the oxidizing chemistry of the ozone in the liquid state.

The wet acid scrubber G will remove water soluble nitrogen oxides and metallic oxides, particularly HgO through discharge line 20. The emitted gas which is now free of nitrogen oxides and metallic elements such as mercury is passes through line 18 to an aqueous alkaline scrubber H. This scrubber contains an alkaline solution whose pH is kept above 7, as described above regarding alkaline scrubber E. Any sulfur oxides that may still be present in the gas stream are reacted to form sulfites and sulfates and removed via discharge line 22. Line 21 provides the source of the aqueous alkaline solution. Lastly, the emitted gas passes through line 23 to be discharged to the atmosphere or for further processing or recycled back to earlier in the process generating the gas stream.

The spent solution from the aqueous alkaline scrubber H can also be employed to neutralize the spent solution from the aqueous acid scrubber G. The dissolved mercuric oxide will precipitate out of the aqueous alkaline solution and can be separated and disposed of or recycled in an environmentally friendly fashion. The neutralized salt solution that is formed is also reusable as it can be concentrated to recover salt which can later be used as a fertilizer.

Figure 3:
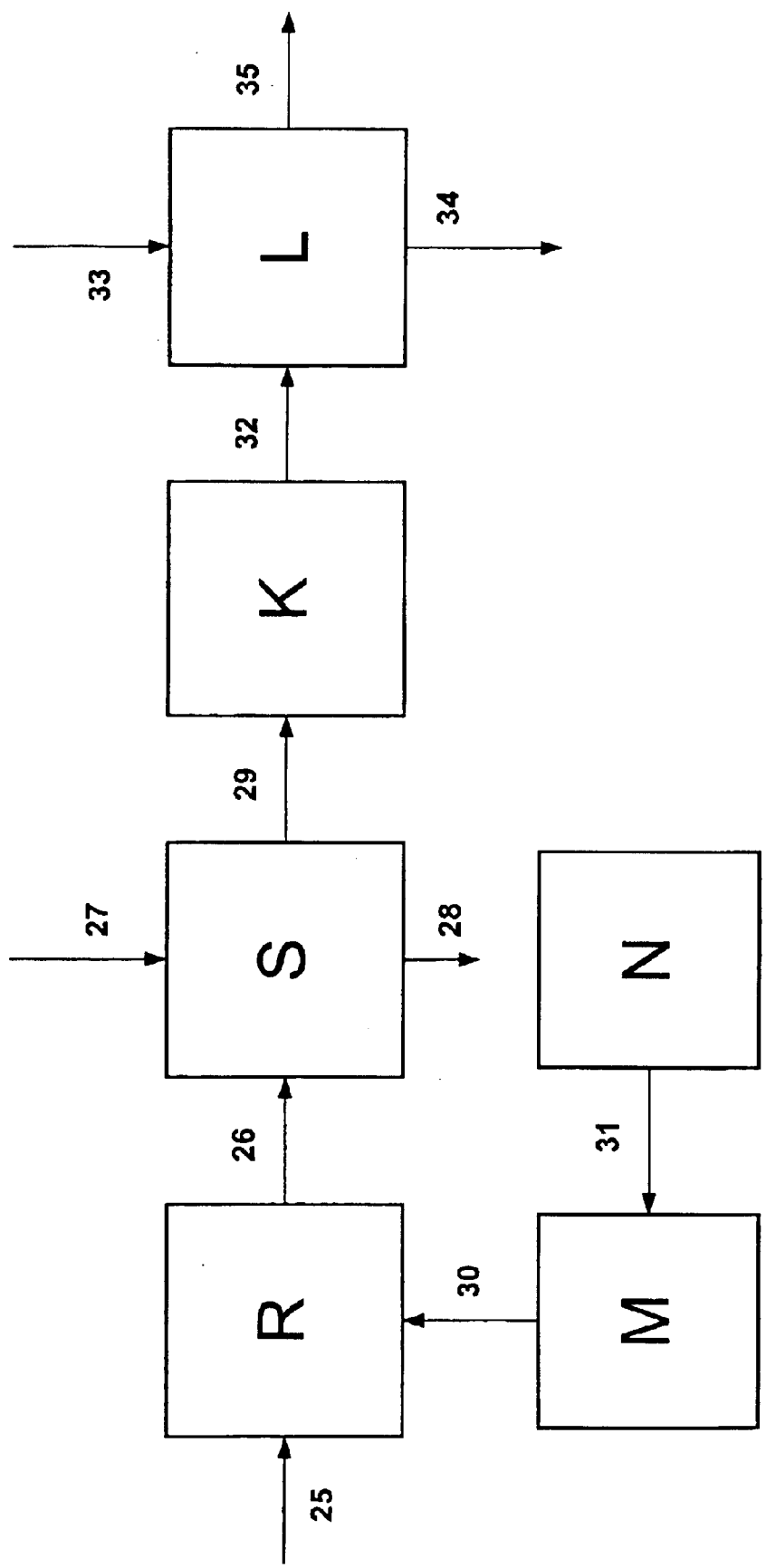
FIG. 3 is a schematic representation of an alternative embodiment of a gas purification system under which the present invention can be practiced.

The alternative embodiment of the invention is described in further detail in FIG. 3.

A gas stream which can be a flue gas stream from an industrial or power generation process that combusts coal is directed into reaction duct R through line 25. The gas stream will typically contain nitrogen oxides, sulfur oxides and heavy metals, most notably mercury. Reaction duct R receives ozone through line 30 from an ozone generator M which in turn receives oxygen through line 31 from oxygen generator N. The ozone generator M can be any type of ozone producer such as a high voltage corona discharge generator or a chemically generated ozone. Typically, the ozone containing gas comprises about 0.5 to about 25% by weight ozone with the balance being oxygen and air components, if air is used to generate ozone.

The ozone will react with the nitrogen oxides to form $N_2O_5$ and if water is present, will also form nitric acid, nitric acid precursors and mixtures thereof. A significant amount of the mercury will react to form HgO. The gas stream containing these impurities is passed through line 26 to a scrubber S. The scrubber may be any suitable vessel and can be equipped with baffling or an inert material to enhance contact between the scrubbing liquid and the gas that is being purified. The aqueous liquid scrubbing step is preferably carried out at a pH greater than 7 and is most preferably carried out at a pH greater that 9.

The aqueous liquid may be water in which case a dilute aqueous nitric acid solution will be produced. However, in preferred embodiments, the aqueous liquid is a dilute basic solution for sulfur oxides removal. Suitable basic aqueous solutions include alkali metal hydroxides such as sodium hydroxide, potassium hydroxide, etc., and alkaline earth metal hydroxides such as calcium hydroxide, magnesium hydroxide, etc. and ammonium hydroxide. Preferably, the aqueous solution contains a base having good water solubility such as sodium hydroxide, potassium hydroxide, ammonium hydroxide, etc. Most preferably, the caustic solution is aqueous sodium hydroxide which is readily available, relatively inexpensive and produces environmentally acceptable products upon reaction with the flue gas components. Input of the aqueous solution containing the appropriate chemicals is through line 27.

The temperature and pressure at which the aqueous scrubbing step is carried out are not critical. This step is typically carried out at a temperature in the range of about 10° to about 90° C. and is more preferably carried out at a temperature in the range of about 20° to about 60° C. Typically, the scrubbing step is carried out at atmospheric pressure and the scrubbing liquid can be introduced either in the form of a spray if the scrubber is a hollow chamber or a trickle stream if the scrubber is packed with inert packing. The scrubbing liquid washes out the $N_2O_5$ and/or nitric acid and particulate materials from the gas being treated. This subsequently passes out through line 28 to be disposed of in an environmentally proper fashion.

The gas stream which now contains a significant reduction in nitrogen oxides and mercury is directed through line 29 to a UV treatment module K. This module is typically a stainless steel vessel equipped with a quartz sleeve separating the UV lamp from the reaction chamber. It is typically equipped with a wiper to remove any accumulating mercuric oxide from the quartz sleeve. The UV light which has a wavelength of 254 nanometers is directed into the reaction area where it contacts the gas containing the nitrogen oxides and mercuric oxides. The gas is allowed to have a sufficient residence time inside of the reaction chamber for the mercury to react to form mercuric oxide. The other impurities present in the gas stream, including already formed mercuric oxide and the nitrogen oxide reaction by-products remain in the gas stream. Residence time will typically be less than 4 seconds. The thus treated gas stream which now contains almost no nitrogen oxides and mercury is directed through line 32 to an acid aqueous scrubber L.

Scrubber L receives aqueous acid solution through line 33 for final nitrogen oxides and mercuric oxide removal. The aqueous acid scrubber L contains an aqueous acidic solution with pH maintained below 7 and preferably in the range of 4 to 7. The $N_2O_5$ and mercuric oxide will react with the acid solution and be discharged through line 34 whereby the discharge solution which contains ionized and elemental mercury is sent for further processing. The gas stream which now has the mercury and nitrogen oxides removed from it is directed through line 35 where it is discharged into the atmosphere, sent for further processing as appropriate or recycled back in the process that generated the gas stream.

Figure 4:
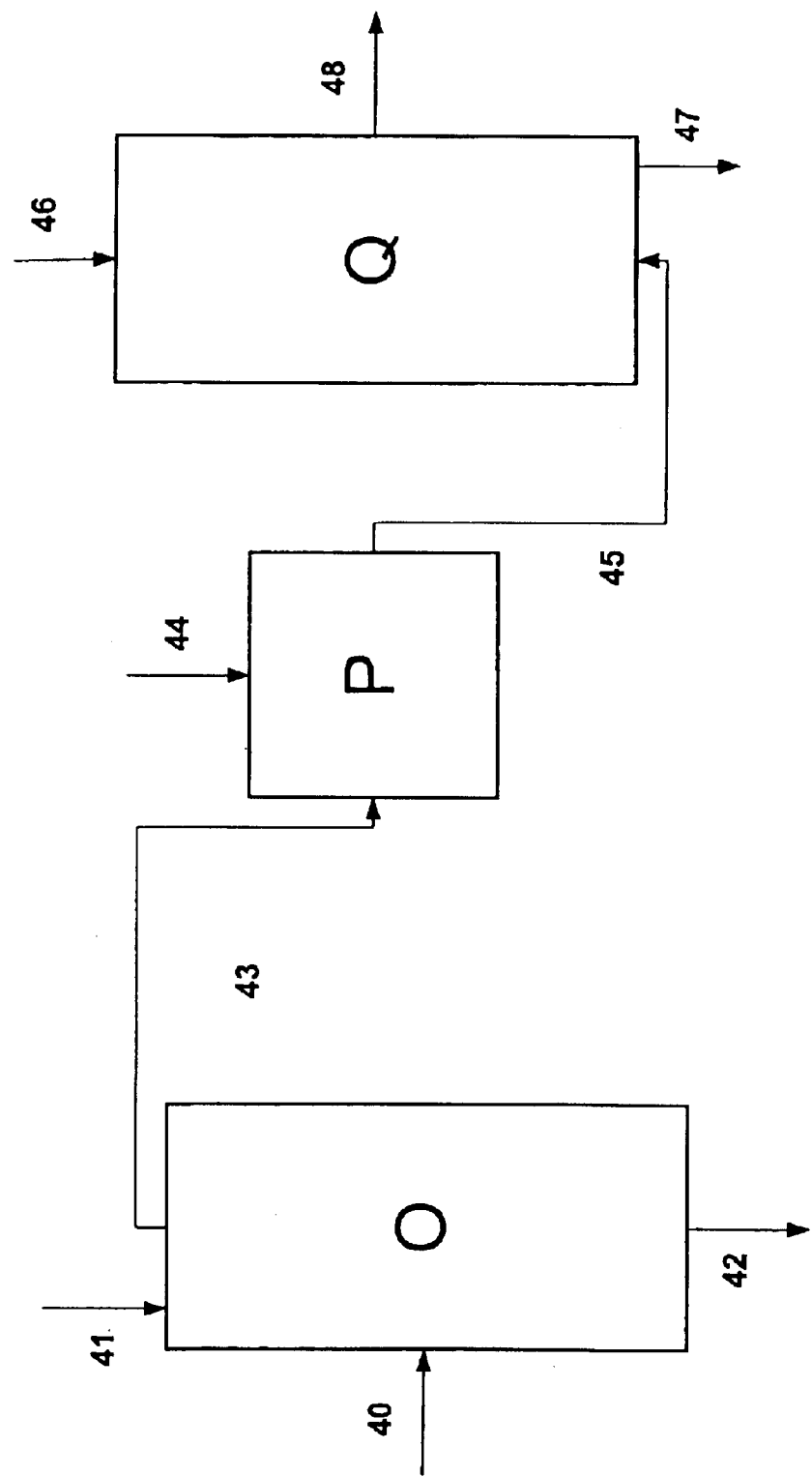
FIG. 4 is a further schematic representation of an embodiment of a gas purification system under which the present invention can be practiced.

An additional embodiment of the present invention is demonstrated in FIG. 4. The process as described in FIG. 4 is useful for gas streams that contain mercuric oxide, HgO, and those that do not contain mercuric oxide.

A gas stream which can be a flue gas stream from an industrial process that combusts coal is directed through line 40 into an aqueous alkaline scrubber O. The scrubber O may be any suitable vessel and can be equipped with baffling or an inert material to enhance contact between the scrubbing liquid and the gas that is being purified. The aqueous liquid scrubbing step is preferably carried out at a pH greater than 7 and is most preferably carried out at a pH greater that 9.

The aqueous liquid may be water in which case a dilute aqueous nitric acid solution will be produced. However, in preferred embodiments, the aqueous liquid is a dilute basic solution. Suitable basic aqueous solutions include alkali metal hydroxides such as sodium hydroxide, potassium hydroxide, etc., and alkaline earth metal hydroxides such as calcium hydroxide, magnesium hydroxide, etc. and ammonium hydroxide. Preferably, the aqueous solution contains a base having good water solubility such as sodium hydroxide, potassium hydroxide, ammonium hydroxide, etc. Most preferably, the caustic solution is aqueous sodium hydroxide which is readily available, relatively inexpensive and produces environmentally acceptable products upon reaction with the flue gas components. Input of the aqueous solution containing the appropriate chemicals is through line 41.

The temperature and pressure at which the aqueous scrubbing step is carried out are not critical. This step is typically carried out at a temperature in the range of about 10° to about 90° C. and is more preferably carried out at a temperature in the range of about 20° to about 60° C. Typically, the scrubbing step is carried out at atmospheric pressure and the scrubbing liquid can be introduced either in the form of a spray if the scrubber is a hollow chamber or a trickle stream if the scrubber is packed with inert packing. The scrubbing liquid washes out the $SO_x$, acid gases and particulate materials from the gas being treated, and will also remove HgO when is present in the gas stream either with or without elemental mercury being present. This subsequently passes out through line 42 to be disposed of in an environmentally proper fashion.

The gas stream which contains nitrogen oxides and mercury is directed along line 43 to reaction duct P, where ozone is added through line 44. The ozone should be injected in a molar ratio to nitrogen oxides and mercury such that about 0.5 to about 5 moles of ozone are injected for every mole of nitrogen oxides and mercury. The residence time at which the ozone remains in the reaction duct P should be sufficient to react the nitrogen oxides and mercury present in the gas stream, however, about 0.5 to about 15 seconds is a sufficient reaction time.

The nitrogen oxides and ozone will react in reaction duct P to form nitric acid, nitric acid precursors and mixtures thereof. The heavy metals, notably mercury present in the gas stream will also be oxidized and form mercuric oxide. This gas stream will pass through line 45 where it will enter aqueous caustic scrubber Q.

Aqueous alkaline solution having a pH above 7 is fed into the scrubber Q through line 46. The scrubber may be any suitable vessel and can be equipped with baffling or an inert material to enhance contact between the scrubbing liquid and the gas that is being purified. The aqueous liquid scrubbing step is preferably carried out at a pH greater than 7 and is most preferably carried out at a pH greater that 9. The aqueous liquid may be water in which case a dilute aqueous nitric acid solution from reaction with the nitrogen oxides will be produced.

However, in preferred embodiments, the aqueous liquid is a dilute basic solution. Suitable basic aqueous solutions include alkali metal hydroxides such as sodium hydroxide, potassium hydroxide, etc., and alkaline earth metal hydroxides such as calcium hydroxide, magnesium hydroxide, etc. and ammonium hydroxide. Preferably, the aqueous solution contains a base having good water solubility such as sodium hydroxide, potassium hydroxide, ammonium hydroxide, etc. Most preferably, the caustic solution is aqueous sodium hydroxide which is readily available, relatively inexpensive and produces environmentally acceptable products upon reaction with the gas stream components.

Line 47 is the discharge line from the alkaline scrubber Q where aqueous solutions of the scrubbed components, notably the $N_2O_5$ and mercuric oxide, are removed from the scrubber. The emitted gas which is now free of nitrogen oxides and metallic elements such as mercury is passed through line 48 to be discharged to the atmosphere or for further processing or recycled back to earlier in the process generating the gas stream.

The invention will now be described by certain examples which should be considered as exemplary hereof and not limiting.

EXAMPLE 1

A dry nitrogen stream with 18 $\mu g/Nm^3$ elementary mercury flowed through a glass reactor in which a temperature about 160° F. was maintained and a residence time of 4 seconds was provided. After 68 ppm ozone was injected into the reactor, the elementary mercury measured at the exit of the reactor reduced to 5 $\mu g/Nm^3$. An elementary mercury reduction of 72% was attained as a result of elemental mercury being oxidized with ozone.

EXAMPLE 2

A wet nitrogen stream with 23 $\mu g/Nm^3$ elementary mercury flowed through a glass reactor in which a temperature about 160° F. was maintained and a residence time of 4 seconds was provided. After 75 ppm ozone was injected into the reactor, the elementary mercury measured at the exit of the reactor reduced to 1 μg/Nm³. A 96% reduction of elementary mercury was attained as a result of oxidation of elemental mercury with ozone in a wet gas stream.

EXAMPLE 3

A wet nitrogen stream with 18 μ/Nm³ elementary mercury and 200 ppm NO flowed through a glass reactor in which a temperature about 160° F. was maintained and a residence time of 4 seconds was provided. After 280 ppm ozone was injected into the reactor, the elementary mercury measured at the exit of the reactor reduced to 5 μg/Nm³. A 78% reduction of elementary mercury was still attained as a result of oxidation of elemental mercury with ozone even in the presence of NOx in a wet gas stream.

EXAMPLE 4
UV Treatment

A wet air stream with 31 μg/Nm³ elementary mercury flowed through a stainless steel reactor with a quartz enclosure hosting a 14 W germicidal UV lamp. A temperature about 160° F. was maintained and a residence time of 3.5 seconds was provided. The elementary mercury measured at the exit of the reactor reduced to 11 μg/Nm³. An elementary mercury reduction of 65% was attained as a result of elemental mercury being oxidized with UV irradiation.

While this invention has been described with respect to particular embodiments thereof, it is apparent that numerous other forms and modifications of the invention will be obvious to those skilled in the art. For example, instead of using scrubber, mercury and mercuric oxide capture can be achieved in a wet electrostatic participator (WESP) or a dry- or wet-flue gas desulfurization scrubber. In addition, the processes presented in this invention can be incorporated into the downstream of an existing pollutant-abatement process, such as selected catalytic reduction technology, to enhance multi-pollutant control. The appended claims in this invention generally should be construed to cover all such obvious forms and modifications which are within the true spirit and scope of the present invention.

Having thus described the invention, what we claim is:

1. A process for removing nitrogen oxides, sulfur oxides, mercury and mercuric oxide from a gas stream comprising the steps:
   (a) feeding said gas stream through an aqueous scrubber;
   (b) feeding said gas stream to a reaction zone and contacting said gas stream with ozone, thereby converting said nitrogen oxides to $N_2O_5$ and said mercury to mercuric oxide;
   (c) feeding said gas stream to an acidic scrubber wherein said $N_2O_5$ and said mercuric oxide are removed from said gas stream; and
   (d) feeding said gas stream to an alkaline scrubber whereby said sulfur oxides react and are removed from said gas stream.

2. The process as claimed in claim 1 wherein said nitrogen oxides are selected from the group consisting of nitric oxide and nitrogen dioxide.

3. The process as claimed in claim 1 wherein said gas stream is a flue gas stream.

4. The process as claimed in claim 1 wherein said aqueous scrubber contains an aqueous alkaline solution.

5. The process as claimed in claim 4 wherein the pH of said aqueous alkaline solution is greater than 7.

6. The process as claimed in claim 1 wherein said ozone is delivered from a corona discharge type ozone generator or a chemically generated ozone producing reaction.

7. The process as claimed in claim 6 wherein said ozone is about 0.5 to about 25% by weight ozone.

8. The process as claimed in claim 1 wherein the molar ratio of ozone to nitrogen oxides and mercury is about 0.5 to about 5.

9. The process as claimed in claim 8 wherein the residence time of ozone in said reaction zone is about 0.5 to about 15 seconds.

10. The process as claimed in claim 1 wherein step (a) removes particulates and water soluble acid gases from said gas stream.

11. The process as claimed in claim 3 wherein said gas stream is from a flue gas stream from a furnace or utility boiler flue gas stream.

12. The process as claimed in claim 3 wherein said gas stream is from a pollutant abatement process.

13. The process as claimed in claim 1 wherein said scrubber is a wet electrostatic precipitator, a dry or wet flue gas desulfurization scrubber.

14. A process for removing nitrogen oxides and mercury from a gas stream comprising the steps of:
   (a) feeding said gas stream through an aqueous scrubber;
   (b) feeding said gas stream to a reaction zone and contacting said gas stream with ozone, thereby converting said nitrogen oxides to $N_2O_5$ and said mercury to mercuric oxide; and
   (c) feeding said gas stream to an acidic scrubber wherein said $N_2O_5$ and said mercuric oxide are removed from said gas stream.

15. The process as claimed in claim 14 wherein said aqueous scrubber contains an aqueous alkaline solution.

16. The process as claimed in claim 15 wherein the pH of said aqueous alkaline solution is greater than 7.

17. The process as claimed in claim 15 wherein the molar ratio of ozone to nitrogen oxides and mercury is about 0.5 to about 5.

18. The process as claimed in claim 17 wherein the residence time of ozone in said reaction zone is about 0.5 to about 15 seconds.

19. The process as claimed in claim 14 wherein said ozone is delivered from a corona discharge type ozone generator or a chemically generated ozone producing reaction.

20. The process as claimed in claim 19 wherein said ozone is about 0.5 to about 25% by weight ozone.

21. The process as claimed in claim 14 wherein step (a) removes particulates and water soluble acid gases from said gas stream.

22. The process as claimed in claim 14 wherein said gas stream is from a flue gas stream from a furnace or utility boiler flue gas stream.

23. The process as claimed in claim 14 wherein said gas stream is from another pollutant abatement process.

24. The process as claimed in claim 14 wherein said scrubber is a wet electrostatic precipitator, a dry or wet flue gas desulfurization scrubber.

* * * * *